(12) United States Patent
Panzarella et al.

(10) Patent No.: US 11,453,614 B2
(45) Date of Patent: *Sep. 27, 2022

(54) SOLAR REFLECTIVE COMPOSITE GRANULES AND METHOD OF MAKING SOLAR REFLECTIVE COMPOSITE GRANULES

(71) Applicant: CERTAINTEED LLC, Malvern, PA (US)

(72) Inventors: Tracy H. Panzarella, Norwood, MA (US); Ryan Koseski, Buffalo, NY (US); Todd P. Dinoia, Littleton, MA (US); Bojana Lante, Northborough, MA (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,994

(22) Filed: Jun. 19, 2020

(65) Prior Publication Data

US 2020/0317579 A1 Oct. 8, 2020

Related U.S. Application Data

(63) Continuation of application No. 15/855,095, filed on Dec. 27, 2017, now Pat. No. 10,730,799.
(Continued)

(51) Int. Cl.
*C04B 35/18* (2006.01)
*C04B 35/63* (2006.01)
(Continued)

(52) U.S. Cl.
CPC ........ *C04B 35/18* (2013.01); *C04B 35/62695* (2013.01); *C04B 35/62805* (2013.01);
(Continued)

(58) Field of Classification Search
CPC .............. C04B 35/18; C04B 35/62695; C04B 35/62805; C04B 35/6303; C04B 35/636;
(Continued)

(56) References Cited

U.S. PATENT DOCUMENTS 1,677,701 A 7/1928 Alton
1,943,525 A 1/1934 Gundlach
(Continued)

FOREIGN PATENT DOCUMENTS

EP 0003302 A1 8/1979
EP 1918416 A1 5/2008
(Continued)

OTHER PUBLICATIONS

ARMA Granule Test Procedures Manual, 36 pages.
(Continued)

*Primary Examiner* — Nathan L Van Sell
(74) *Attorney, Agent, or Firm* — Abel Schillinger, LLP; Thomas H. Osborn (57) ABSTRACT

A method of making a plurality of composite granules can include: forming green body granules comprising an aluminosilicate; heating the green body granules to form sintered granules; cooling the sintered granules according to a cooling regime, wherein the cooling regime comprises a temperature hold between 700° C. and 900° C. for at least one hour. In a particular embodiment, the aluminosilicate for making the composite granules can have a particle size less than 150 μm. The composite granules are particularly suitable as roofing granules and can have a desired combination of high solar reflectance SR and low lightness L*, a low bulk density, good weather resistance and strength.

16 Claims, 7 Drawing Sheets

Related U.S. Application Data (60) Provisional application No. 62/441,178, filed on Dec. 31, 2016.

(51) Int. Cl.
*C04B 35/636* (2006.01)
*C04B 41/00* (2006.01)
*C04B 35/626* (2006.01)
*C04B 35/628* (2006.01)
*E04D 7/00* (2006.01)
*C04B 111/00* (2006.01)

(52) U.S. Cl.
CPC ........ *C04B 35/6303* (2013.01); *C04B 35/636* (2013.01); *C04B 41/0081* (2013.01); *C04B 2111/00586* (2013.01); *C04B 2235/3206* (2013.01); *C04B 2235/3218* (2013.01); *C04B 2235/3232* (2013.01); *C04B 2235/3284* (2013.01); *C04B 2235/3463* (2013.01); *C04B 2235/402* (2013.01); *C04B 2235/5427* (2013.01); *C04B 2235/5436* (2013.01); *C04B 2235/5472* (2013.01); *C04B 2235/608* (2013.01); *C04B 2235/61* (2013.01); *C04B 2235/6562* (2013.01); *C04B 2235/6565* (2013.01); *C04B 2235/9646* (2013.01); *E04D 7/005* (2013.01)

(58) Field of Classification Search
CPC ........ C04B 41/0081; C04B 2235/6562; C04B 2235/3232; C04B 2235/3284; C04B 2235/5472; C04B 2235/3218; C04B 2235/3206; C04B 2111/00586; C04B 2235/9646; C04B 2235/402; C04B 2235/5427; C04B 2235/5436; C04B 2235/608; C04B 2235/61; C04B 2235/6565; C04B 2235/3463; E04D 7/005
See application file for complete search history.

(56) References Cited

U.S. PATENT DOCUMENTS

| | | |
|---|---|---|
| RE19,372 E | 11/1934 | Walton |
| 2,001,448 A | 5/1935 | Beasley |
| 2,027,029 A | 1/1936 | Eckert |
| 2,057,677 A | 10/1936 | Gundlach |
| 2,057,678 A | 10/1936 | Gundlach |
| 2,057,679 A | 10/1936 | Gundlach |
| RE20,295 E | 3/1937 | Fisher |
| 2,133,728 A | 10/1938 | Teetor |
| 2,142,540 A | 1/1939 | Veazey |
| 2,147,058 A | 2/1939 | Randall et al. |
| 2,197,895 A | 4/1940 | Nichols |
| 2,379,358 A | 6/1945 | Jewett |
| 2,417,058 A | 3/1947 | Buzzell et al. |
| 2,591,149 A | 4/1952 | Grove |
| 2,614,051 A | 10/1952 | Buzzell et al. |
| 2,695,851 A | 11/1954 | Lodge |
| 2,732,311 A | 1/1956 | Hartwright |
| 2,799,241 A | 7/1957 | Wurster |
| 2,898,232 A | 8/1959 | Miller et al. |
| 2,927,045 A | 3/1960 | Lodge et al. |
| 2,963,378 A | 12/1960 | Palmquist et al. |
| 2,978,340 A | 4/1961 | Veatch et al. |
| 2,981,636 A | 4/1961 | Lodge et al. |
| 2,986,476 A | 5/1961 | Larssen |
| 3,030,215 A | 4/1962 | Veatch et al. |
| 3,089,824 A | 5/1963 | Wurster |
| 3,117,027 A | 1/1964 | Lindlof et al. |
| 3,129,086 A | 4/1964 | Veatch et al. |
| 3,196,827 A | 7/1965 | Wurster et al. |
| 3,207,824 A | 9/1965 | Wurster et al. |
| 3,223,540 A | 12/1965 | Limes et al. |
| 3,230,064 A | 1/1966 | Veatch et al. |
| 3,241,520 A | 3/1966 | Wurster et al. |
| 3,253,944 A | 5/1966 | Wurster |
| 3,255,031 A | 6/1966 | Lodge et al. |
| 3,257,199 A | 6/1966 | Schmidt |
| 3,365,315 A | 1/1968 | Beck et al. |
| 3,397,073 A | 8/1968 | Fehner |
| 3,479,201 A | 11/1969 | Sloan |
| 3,507,676 A | 4/1970 | McMahon |
| 3,528,842 A | 9/1970 | Skadulis |
| 3,752,696 A | 8/1973 | Beyard et al. |
| 3,792,136 A | 2/1974 | Schmitt |
| 3,918,407 A | 11/1975 | Greenberg |
| 3,932,143 A | 1/1976 | Marshall et al. |
| 3,945,945 A | 3/1976 | Kiovsky et al. |
| 3,961,628 A | 6/1976 | Arnold |
| 3,974,303 A | 8/1976 | Iwase et al. |
| 3,985,540 A | 10/1976 | Fein et al. |
| 4,036,661 A | 7/1977 | Schmidt et al. |
| 4,038,239 A | 7/1977 | Coyner et al. |
| 4,092,441 A | 5/1978 | Meyer et al. |
| 4,111,713 A | 9/1978 | Beck |
| 4,218,502 A | 8/1980 | Graham et al. |
| 4,234,639 A | 11/1980 | Graham |
| 4,279,632 A | 7/1981 | Frosch et al. |
| 4,287,248 A | 9/1981 | Gessner et al. |
| 4,292,882 A | 10/1981 | Clausen |
| 4,378,408 A | 3/1983 | Joedicke |
| 4,391,646 A | 7/1983 | Howell |
| 4,478,869 A | 10/1984 | Brady et al. |
| 4,583,486 A | 4/1986 | Miller |
| 4,623,588 A | 11/1986 | Nuwayser et al. |
| 4,631,267 A | 12/1986 | Lachman et al. |
| 4,675,140 A | 6/1987 | Sparks et al. |
| 4,708,812 A | 11/1987 | Hatfield |
| 4,717,614 A | 1/1988 | Bondoc et al. |
| 4,735,975 A | 4/1988 | Iwata et al. |
| 4,744,831 A | 5/1988 | Beck |
| 4,767,726 A | 8/1988 | Marshall |
| 4,895,754 A | 1/1990 | Graham et al. |
| 4,916,014 A | 4/1990 | Weber et al. |
| 4,920,090 A | 4/1990 | Ritter et al. |
| 4,946,505 A | 8/1990 | Jungk |
| 5,000,999 A | 3/1991 | Hollander |
| 5,022,897 A | 6/1991 | Balcar et al. |
| 5,039,311 A | 8/1991 | Bloecher |
| 5,052,162 A | 10/1991 | Bush et al. |
| 5,077,241 A | 12/1991 | Moh et al. |
| 5,147,686 A | 9/1992 | Ichimura et al. |
| 5,180,240 A | 1/1993 | Gueret |
| 5,180,585 A | 1/1993 | Jacobson et al. |
| 5,194,113 A | 3/1993 | Lasch et al. |
| 5,225,123 A | 7/1993 | Torobin |
| 5,240,760 A | 8/1993 | George et al. |
| 5,310,803 A | 5/1994 | Hansen |
| 5,356,664 A | 10/1994 | Narayan et al. |
| 5,362,566 A | 11/1994 | George et al. |
| 5,366,767 A | 11/1994 | Howard |
| 5,380,552 A | 1/1995 | George et al. |
| 5,380,687 A | 1/1995 | Mangold et al. |
| 5,382,475 A | 1/1995 | Kayser |
| 5,397,759 A | 3/1995 | Torobin |
| 5,411,803 A | 5/1995 | George et al. |
| 5,427,793 A | 6/1995 | Bigham et al. |
| 5,456,785 A | 10/1995 | Venable |
| 5,484,477 A | 1/1996 | George et al. |
| 5,503,840 A | 4/1996 | Jacobson et al. |
| 5,514,350 A | 5/1996 | Kear et al. |
| 5,516,573 A | 5/1996 | George et al. |
| 5,541,350 A | 7/1996 | Murata et al. |
| 5,571,596 A | 11/1996 | Johnson |
| 5,573,782 A | 11/1996 | Bigham et al. |
| 5,595,750 A | 1/1997 | Jacobson et al. |
| 5,595,813 A | 1/1997 | Ogawa et al. |
| 5,599,586 A | 2/1997 | Israel |
| 5,616,532 A | 4/1997 | Heller et al. |
| 5,620,554 A | 4/1997 | Venable |

(56) References Cited

U.S. PATENT DOCUMENTS

| | | |
|---|---|---|
| 5,643,399 A | 7/1997 | Venable |
| 5,688,592 A | 11/1997 | Shibahashi et al. |
| 5,713,974 A | 2/1998 | Martin et al. |
| 5,723,516 A | 3/1998 | Bigham et al. |
| 5,731,369 A | 3/1998 | Mahoney |
| 5,733,842 A | 3/1998 | Gerdes et al. |
| 5,770,295 A | 6/1998 | Alderman |
| 5,776,541 A | 7/1998 | Belt et al. |
| 5,783,506 A | 7/1998 | Eppler et al. |
| 5,795,389 A | 8/1998 | Koschitzky |
| 5,840,111 A | 11/1998 | Wiederhoft et al. |
| 5,876,683 A | 3/1999 | Glumac et al. |
| 5,888,930 A | 3/1999 | Smith et al. |
| 5,928,761 A | 7/1999 | Hedblom et al. |
| 5,961,943 A | 10/1999 | Komatsu et al. |
| 5,962,143 A | 10/1999 | Krauthauser et al. |
| 5,975,988 A | 11/1999 | Christianson |
| 6,036,777 A | 3/2000 | Sachs |
| 6,037,289 A | 3/2000 | Chopin et al. |
| 6,063,312 A | 5/2000 | Mannheimer |
| 6,063,849 A | 5/2000 | Morris et al. |
| 6,120,913 A | 9/2000 | Kluttz et al. |
| 6,124,466 A | 9/2000 | Matsuno et al. |
| 6,143,318 A | 11/2000 | Gilchrist et al. |
| 6,156,245 A | 12/2000 | Takebayashi et al. |
| 6,174,360 B1 | 1/2001 | Sliwinski et al. |
| 6,214,466 B1 | 4/2001 | Joedicke |
| 6,217,252 B1 | 4/2001 | Tolliver et al. |
| 6,235,372 B1 | 5/2001 | Joedicke |
| 6,238,794 B1 | 5/2001 | Beesley et al. |
| 6,245,381 B1 | 6/2001 | Israel |
| 6,245,850 B1 | 6/2001 | Fields |
| 6,296,912 B1 | 10/2001 | Zickell |
| 6,306,795 B1 | 10/2001 | Ryan et al. |
| 6,355,309 B1 | 3/2002 | Fleming et al. |
| 6,362,121 B1 | 3/2002 | Chopin et al. |
| 6,366,397 B1 | 4/2002 | Genjima et al. |
| 6,372,678 B1 | 4/2002 | Youngman et al. |
| 6,376,075 B1 | 4/2002 | Tacke-Willemsen et al. |
| 6,426,309 B1 | 7/2002 | Miller et al. |
| 6,446,402 B1 | 9/2002 | Byker et al. |
| 6,451,874 B1 | 9/2002 | Purgett et al. |
| 6,454,848 B2 | 9/2002 | Sliwinski et al. |
| 6,465,088 B1 | 10/2002 | Talpaert et al. |
| 6,495,074 B1 | 12/2002 | Carr |
| 6,500,555 B1 | 12/2002 | Khaldi |
| 6,502,360 B2 | 1/2003 | Carr, III et al. |
| 6,521,004 B1 | 2/2003 | Culler et al. |
| 6,521,038 B2 | 2/2003 | Yanagimoto et al. |
| 6,531,200 B2 | 3/2003 | Zickell et al. |
| 6,533,961 B2 | 3/2003 | Harelstad et al. |
| 6,537,703 B2 | 3/2003 | Dupasquier et al. |
| 6,548,145 B2 | 4/2003 | Joedicke |
| 6,569,520 B1 | 5/2003 | Jacobs |
| 6,572,748 B1 | 6/2003 | Herrmann et al. |
| 6,572,784 B1 | 6/2003 | Coombs et al. |
| 6,596,070 B1 | 7/2003 | Schmidt et al. |
| 6,599,355 B1 | 7/2003 | Schmidt et al. |
| 6,607,781 B2 | 8/2003 | Joedicke |
| 6,610,135 B1 | 8/2003 | Ohmori et al. |
| 6,610,147 B2 | 8/2003 | Aschenbeck |
| 6,647,688 B1 | 11/2003 | Gaitan et al. |
| 6,653,356 B2 | 11/2003 | Sherman |
| 6,680,134 B2 | 1/2004 | Maurer et al. |
| 6,692,824 B2 | 2/2004 | Benz et al. |
| 6,703,127 B2 | 3/2004 | Davis et al. |
| 6,758,019 B2 | 7/2004 | Kalkanoglu et al. |
| 6,797,277 B2 | 9/2004 | Heier et al. |
| 6,861,145 B2 | 3/2005 | Nastke et al. |
| 6,881,702 B2 | 4/2005 | Arnold et al. |
| 6,905,698 B1 | 6/2005 | Aldcroft et al. |
| 6,933,007 B2 | 8/2005 | Fensel et al. |
| 6,936,644 B2 | 8/2005 | Gilleo |
| 7,059,800 B2 | 6/2006 | Jones et al. |
| 7,070,843 B2 | 7/2006 | Bartek et al. |
| 7,070,844 B2 | 7/2006 | Bartek |
| 7,125,601 B1 | 10/2006 | Pinault et al. |
| 7,132,143 B2 | 11/2006 | Zanchetta et al. |
| 7,176,245 B2 | 2/2007 | Stucky et al. |
| 7,238,408 B2 | 7/2007 | Aschenbeck et al. |
| 7,241,500 B2 | 7/2007 | Shiao et al. |
| 7,294,404 B2 | 11/2007 | Krisko et al. |
| 7,335,419 B2 | 2/2008 | Azari et al. |
| 7,387,839 B2 | 6/2008 | Gueneau et al. |
| 7,422,989 B2 | 9/2008 | Kalkanoglu et al. |
| 7,452,598 B2 | 11/2008 | Shiao et al. |
| 7,510,763 B2 | 3/2009 | Gueneau et al. |
| 7,592,066 B2 | 9/2009 | Shiao et al. |
| 7,658,862 B2 | 2/2010 | Talamoni |
| 7,815,977 B2 | 10/2010 | Besson et al. |
| 7,976,909 B2 | 7/2011 | Durandeau et al. |
| 8,349,435 B2 | 1/2013 | Shiao et al. |
| 8,507,092 B2 | 8/2013 | Fan et al. |
| 8,530,034 B2 | 9/2013 | Khan |
| 8,668,954 B2 | 3/2014 | Hong |
| 8,722,140 B2 | 5/2014 | Shiao et al. |
| 9,303,407 B2 | 4/2016 | Sexauer et al. |
| 9,534,293 B2 | 1/2017 | Besson et al. |
| 2002/0028361 A1 | 3/2002 | Boire et al. |
| 2002/0066233 A1 | 6/2002 | McArdle et al. |
| 2002/0092596 A1 | 7/2002 | Phillips et al. |
| 2002/0095871 A1 | 7/2002 | McArdle et al. |
| 2002/0098110 A1 | 7/2002 | Graham et al. |
| 2002/0160151 A1 | 10/2002 | Pinault et al. |
| 2002/0182334 A1 | 12/2002 | Marzolin et al. |
| 2003/0035972 A1 | 2/2003 | Hanson et al. |
| 2003/0037698 A1 | 2/2003 | Kiik et al. |
| 2003/0044525 A1 | 3/2003 | Aschenbeck |
| 2003/0060569 A1 | 3/2003 | White et al. |
| 2003/0068303 A1 | 4/2003 | Selvig et al. |
| 2003/0068469 A1 | 4/2003 | Aschenbeck et al. |
| 2003/0091795 A1 | 5/2003 | Kiik et al. |
| 2003/0091814 A1 | 5/2003 | Benz et al. |
| 2003/0108668 A1 | 6/2003 | Joedicke |
| 2003/0152747 A1 | 8/2003 | Fensel et al. |
| 2003/0203145 A1 | 10/2003 | Zanchetta et al. |
| 2003/0219563 A1 | 11/2003 | Zanchetta et al. |
| 2004/0076826 A1 | 4/2004 | Lee |
| 2004/0109985 A1 | 6/2004 | Furst |
| 2004/0110639 A1 | 6/2004 | Joedicke |
| 2004/0170806 A1 | 9/2004 | Hittle et al. |
| 2004/0255548 A1 | 12/2004 | Hong et al. |
| 2004/0258835 A1 | 12/2004 | Hong et al. |
| 2005/0053745 A1 | 3/2005 | Bartek et al. |
| 2005/0053746 A1 | 3/2005 | Bartek |
| 2005/0064175 A1 | 3/2005 | Azari et al. |
| 2005/0072110 A1 | 4/2005 | Shiao et al. |
| 2005/0072114 A1 | 4/2005 | Shiao et al. |
| 2005/0074580 A1 | 4/2005 | Gross et al. |
| 2005/0197248 A1 | 9/2005 | Ohtsu et al. |
| 2005/0243388 A1 | 11/2005 | Tsuji |
| 2006/0003651 A1 | 1/2006 | Grube et al. |
| 2006/0014050 A1 | 1/2006 | Gueneau et al. |
| 2006/0110996 A1 | 5/2006 | Getlichermann et al. |
| 2006/0251807 A1 | 11/2006 | Hong et al. |
| 2007/0054129 A1 | 3/2007 | Kalkanoglu et al. |
| 2007/0054557 A1 | 3/2007 | Larson |
| 2007/0054576 A1 | 3/2007 | Kalkanoglu et al. |
| 2007/0065640 A1 | 3/2007 | Joedicke |
| 2007/0065641 A1 | 3/2007 | Joedicke |
| 2007/0092734 A1 | 4/2007 | Durandeau et al. |
| 2007/0110961 A1 | 5/2007 | Fensel et al. |
| 2007/0148340 A1 | 6/2007 | Kalkanoglu et al. |
| 2007/0148342 A1 | 6/2007 | Kalkanoglu et al. |
| 2008/0008832 A1 | 1/2008 | Shiao et al. |
| 2008/0008858 A1 | 1/2008 | Hong et al. |
| 2008/0026161 A1 | 1/2008 | Frings et al. |
| 2008/0038513 A1 | 2/2008 | Grube et al. |
| 2008/0095984 A1 | 4/2008 | Desouto |
| 2008/0107820 A1 | 5/2008 | Gabelnick et al. |
| 2008/0115444 A1 | 5/2008 | Kalkanoglu et al. |
| 2008/0131664 A1 | 6/2008 | Teng et al. |
| 2008/0160188 A1 | 7/2008 | Teng et al. |
| 2009/0047474 A1 | 2/2009 | Gross et al. |

(56) References Cited

U.S. PATENT DOCUMENTS

| | | |
|---|---|---|
| 2009/0075067 A1 | 3/2009 | Myli et al. |
| 2009/0075069 A1 | 3/2009 | Myli et al. |
| 2009/0117329 A1 | 5/2009 | Leitch et al. |
| 2009/0317593 A1 | 12/2009 | Smith et al. |
| 2010/0203336 A1 | 8/2010 | Shiao et al. |
| 2012/0288678 A1 | 11/2012 | Grube et al. |
| 2013/0108873 A1 | 5/2013 | Shiao et al. |
| 2013/0121297 A1 | 5/2013 | Kim et al. |
| 2014/0094358 A1 | 4/2014 | Koszo |
| 2014/0186582 A1 | 7/2014 | Hong |
| 2014/0287166 A1 | 9/2014 | Kalkanoglu et al. |
| 2014/0370242 A1* | 12/2014 | Constantz .............. E04D 7/005 428/143 |
| 2014/0371061 A1 | 12/2014 | Riley |
| 2015/0113901 A1 | 4/2015 | Bai et al. |

FOREIGN PATENT DOCUMENTS

| | | |
|---|---|---|
| FR | 2670506 A1 | 6/1992 |
| FR | 2857030 A1 | 1/2005 |
| GB | 1203285 A | 8/1970 |
| GB | 1214816 A | 12/1970 |
| JP | S61176501 A | 8/1986 |
| JP | 2002018358 A | 1/2002 |
| JP | 2004162482 A | 6/2004 |
| WO | 1994023580 A | 10/1994 |
| WO | 1996007538 A1 | 3/1996 |
| WO | 1997010186 A1 | 3/1997 |
| WO | 2000011949 A1 | 3/2000 |
| WO | 2003087002 A1 | 10/2003 |
| WO | 2005007286 A1 | 1/2005 |
| WO | 2006049865 A1 | 5/2006 |
| WO | 2008045992 A1 | 4/2008 |
| WO | 2015157615 A1 | 10/2015 |

OTHER PUBLICATIONS

Standard Test Method for Determination of Solar Reflectance Near Ambient Temperature Using a Portable Solar Reflectometer, accessed Jan. 31, 2011, 6 pages, ASTM International, US.

Koseski, R., "Manipulation of microstructure, phase evolution and mechanical properties by devitrification of andesite for use as a proppant," Materials Science and Engineering Dissertation, Pennsylvania State University, Dec. 2008, 255 pages.

Luscher, W. G. et al., "A Critical Review of the Diametral Compression Method for Determining the Tensile Strength of Spherical Aggregates," Journal of Testing and Evaluation, 2008, pp. 624-629, vol. 35, No. 6.

Karamanov, A. et al., "Crystallization phenomena in iron-rich glasses," Journal of Non-Crystalline Solids, 2001, pp. 139-151, vol. 281, Elsevier.

Strens, R.G.J. et al., "Diffuse reflectance spectra and optical properties of some iron and titanium oxides and oxyhydroxides," Mineralogical Magazine, Sep. 1979, pp. 347-354, vol. 43.

Ikesue, A. et al., "Progress in Ceramic Lasers," Ann. Rev. Mater. Res., 2006, pp. 397-429, vol. 36.

\* cited by examiner

SOLAR REFLECTIVE COMPOSITE GRANULES AND METHOD OF MAKING SOLAR REFLECTIVE COMPOSITE GRANULES

CROSS-REFERENCE TO RELATED APPLICATION(S)

This application is a continuation application of and claims priority under 35 U.S.C. § 120 to U.S. patent application Ser. No. 15/855,095, entitled "SOLAR REFLECTIVE COMPOSITE GRANULES AND METHOD OF MAKING SOLAR REFLECTIVE COMPOSITE GRANULES," by Tracy H. PANZARELLA et al., filed Dec. 27, 2017, which claims priority under 35 U.S.C. § 119(e) to U.S. Provisional Patent Application No. 62/441,178, entitled "SOLAR REFLECTIVE COMPOSITE GRANULES AND METHOD OF MAKING SOLAR REFLECTIVE COMPOSITE GRANULES," by Tracy H. PANZARELLA et al., filed Dec. 31, 2016, of which both applications are assigned to the current assignee hereof and incorporated herein by reference in their entireties

FIELD OF THE DISCLOSURE

The present disclosure relates to solar reflective composite granules including an aluminosilicate. The disclosure further relates to a method of making the solar reflective composite granules.

BACKGROUND

Solar reflectivity has gained large prominence as a roofing feature due to regulatory pressure and customer preference. Traditionally, to produce solar reflective (SR) granules, standard base rock is crushed to a particle size of about 0.5 mm to 1.5 mm and the sized particles are coated to cover the granules with a solar reflective layer. The SR coating of the granules contributes to a significant amount of the material, energy, time, and total costs of producing the SR granules. Moreover, when crushing the base rock, about 40 wt % to 50 wt % of the crushed stone is considered as waste material, also called granule fines, since the particle sizes are lower than the desired size range for roofing granules.

There is a need for more economic ways of manufacturing roofing granules with a high solar reflectance. Furthermore, there is a continuing need for roofing granules with a high solar reflectance but low lightness L* value.

SUMMARY

According to one embodiment, a method of making a plurality of composite granules, comprising: forming green body granules comprising an aluminosilicate; heating the green body granules to form sintered granules; cooling the sintered granules according to a cooling regime, wherein the cooling regime comprises a temperature hold between 700° C. and 900° C. for at least one hour.

According to another embodiment, a method of making a plurality of composite granules, comprising: forming a plurality of green body granules comprising an aluminosilicate; heating the green body granules to form sintered granules; and cooling the sintered composite granules at a cooling rate of not greater than 2° C. per minute to a temperature of 750° C.

According to a further embodiment, a plurality of composite granules, comprising: a bulk density of not greater than 1 g/cm$^3$; an amount of aluminosilicate of at least 50 wt %; an amount of aluminum trihydrate (ATH) of at least 2 wt %; a solar reflectance of at least 30%; an L* value of not greater than 50; and an average crush strength of at least 45 N.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Various embodiments of the present disclosure will now be described, by way of example only, with reference to the accompanying drawings.

The present disclosure relates to roofing granules made by an economic process, wherein the roofing granules may have a light weight and desired strength, weather resistance, and optical properties, such as solar reflectance (SR) and lightness L*.

As used herein, the term "granule fines" is intended to mean small rock particles obtained by crushing of rock, wherein the granule fines having a particle size smaller than 0.5 mm. In particular embodiments, the granule fines have a particle size below 150 μm.

As used herein, the term "green body granules" is intended to mean granules that include granule fines, a binder, and a solvent and have not being subjected to high temperature sintering.

As used herein, the term "composite granules" is intended to mean granules obtained after high temperature sintering of the green body granules. In a particular embodiment, the sintering temperature may be at least 1000° C.

As used herein, by "mesh size" is meant ASTM U.S. standard mesh size unless otherwise indicated.

Figure 1A:
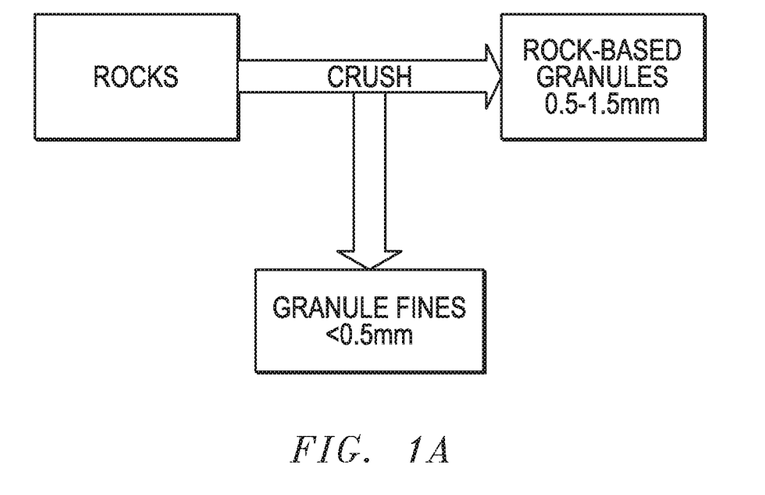
FIG. 1A includes an illustration of commercial stone crushing to obtain rock-based roofing granules.

FIG. 1A gives an overview of a commercial process of making aluminosilicate rock-based roofing granules, starting from crushing base rock to obtain granules having a particle size typically in a range between 0.5 and 1.5 mm, and a fraction containing fines with a particles size of smaller than 0.5 mm, which are granule fines. Before the inventors' discovery, the granule fines may have been considered waste; however, the inventors have developed a process to recover a significant portion of the granule fines that can be useful as roofing granules or for other applications.

Figure 1B:
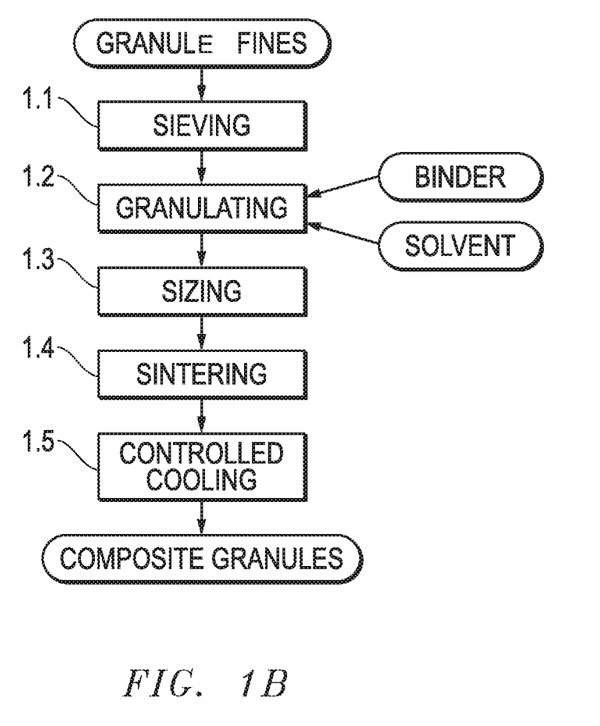
FIG. 1B includes an illustration of the process of the present disclosure according to one embodiment.

In embodiments, the method of the present disclosure relates to the making of composite granules from the aluminosilicate granule fines obtained as by-product from the rock crushing as shown in FIG. 1A. In embodiments, as further demonstrated in FIG. 1B, the composite granules of the present disclosure can be made by a method using the aluminosilicate granule fines of FIG. 1A as starting material. The method may include sieving the granule fines into fractions of particular particle size ranges (1.1); granulating the fractioned granule fines together with a binder and a solvent to form green body granules (1.2); sizing the green body granules (1.3); high temperature sintering the sized green body granules (1.4); and cooling the sintered granules according to a controlled cooling regime (1.5). The composite granules of the present disclosure are characterized by having a light weight, good strength and wearability and desirable optical properties, making them very suitable for the use as low-cost roofing granules.

In a particular embodiment, the granule fines used as starting material in the process of the present disclosure can be an aluminosilicate material from crushed base rock, such as rhyolite, andesite, basalt, or meta-basalt.

In embodiments, the aluminosilicate granule fines may be sieved to obtain granule fines having a particle size not greater than 250 μm, such as not greater than 200 μm, not greater than 180 μm, not greater than 150 μm, or not greater than 120 μm. In other embodiments, the particle size of the aluminosilicate can be at least 0.5 μm, such as at least 1 μm, at least 5 μm, at least 10 μm, at least 20 μm, at least 30 μm, or at least 40 μm. The particles size of the aluminosilicate granule fines can be a value between any of the minimum and maximum values noted above, such as from 0.5 μm to 200 μm, from 10 μm to 150 μm, or from 30 μm to 120 μm.

In further embodiments, the amount of the aluminosilicate granule fines based on the total weight of the green body granules formed during granulation may be at least 50 wt %, such as at least 60 wt %, at least 70 wt %, at least 80 wt %, or at least 90 wt % based on the total weight of the green body granules. In yet other embodiments, the amount of aluminosilicate may be not greater than 99 wt %, such as not greater than 98 wt %, or not greater than 95 wt % based on the total dry weight of the green body granules. The amount of aluminosilicate can be a value within any of the minimum and maximum values noted above, such as from 50 wt % to 99 wt %, from 60 wt % to 98 wt %, or from 70 wt % to 95 wt %, based on the total dry weight of the green body granules.

The binder used for making the green body granules of the present disclosure may not be particularly limited, as long it can properly function as a binder. In a particular embodiment, the binder can be modified starch, for example, ethoxylated starch. In aspects, the amount of the binder can be at least 0.1 wt %, such as at least 0.3 wt %, or at least 0.5 wt % based on a total weight of the green body granules. In other aspects, the amount of binder may be not greater than 5 wt %, such as not greater than 3 wt %, not greater than 1 wt %, or not greater than 0.8 wt % based on a total weight of the green body granules.

The type of solvent for forming the green body granules may also not be limited. In a particular embodiment, the solvent can be water. In certain aspects, the solvent can have an amount of at least 0.5 wt %, at least 1 wt %, at least 2 wt %, at least 3 wt %, or at least 5 wt % based on the total weight of the green body granules. In other aspects, the solvent may not be greater than 20 wt %, such as not greater than 15 wt %, not greater than 12 wt %, or not greater than 10 wt % based on the total weight of the green body granules.

In certain embodiments, the green body granules can be formed by granulating a mixture comprising at least 50 wt % aluminosilicate granule fines, at least 0.5 wt % binder, and at least 10 wt % solvent based on the total weight of the green body granules.

In particular embodiments, the granulating mixture can contain aluminosilicate granule fines in an amount of at least about 80 wt %, a binder of at least 0.5 wt %, and water of at least about 10 wt % based on the total weight of the granulating mixture.

In embodiments, the sizing (1.3) of the green body granules formed from the granulating mixture before high temperature sintering may be conducted by removing very large and very fine particle via sieving. In particular embodiments, the green body granules after sizing (1.3) and before high temperature sintering (1.4) may be not greater than 5 mm, such as not greater than 4 mm, not greater than 3.5 mm, not greater than 3.0 mm, not greater than 2.5 mm, not greater than 2.0 mm, or not greater than 1.5 mm. In other embodiments, the size of the green body granules may be at least 0.3 mm, such as at least 0.4 mm, or at least 0.5 mm. The green body granules after sizing (1.3) can have a value between any of the minimum and maximum values noted above, such as from 0.3 mm to 5 mm, from 0.5 mm to 3.0 mm, or from 0.7 mm to 2.0 mm.

The high temperature sintering (1.4) of the green body granules can be conducted such that the green body granules are heated up to a maximum sintering temperature, keeping the temperature at the maximum sintering temperature for a certain time period, and thereafter conducting a controlled cooling (1.5) of the sintered granules.

In certain embodiments, the maximum temperature of the high temperature sintering (1.4) may be not greater than 1300° C., such as not greater than 1250° C., not greater than 1200° C., not greater than 1150° C., not greater than 1100°

C., or not greater than 1075° C. In other particular embodiments, the sintering temperature may be at least 1000° C., such as at least 1020° C., or at least 1050° C. The maximum sintering temperature may be a value between any of the maximum and minimum values noted above, such as from 1000° C. to 1300° C., from 1025° C. to 1150° C., or from 1050° C. to 1100° C.

In embodiments, the time for heating at the maximum sintering temperature can be at least 1 minute, at least 5 minutes, at least 10 minutes, or at least 30 minutes. In other embodiment, the heating at the maximum sintering temperature may be not longer than 5 hours, such as not longer than 3 hours, not longer than 2 hours, or not longer than 1 hour. The time for heating at the maximum sintering temperature can have a value between and or the minimum and maximum values note above, such as from 1 minute to 3 hours, from 5 minutes to 1 hour, or from 10 minutes to 45 minutes.

Unexpectedly, the cooling treatment regime can affect the solar reflectance of the obtained composite granules. If during controlled cooling of the granules (1.5) a temperature hold is conducted at a temperature range between 700° C. and 900° C., the obtained composite granules can have a higher solar reflectance than composited granules made without a temperature hold during cooling, wherein the temperature is allowed to fall freely at the natural rate of the furnace without controlling the speed during the temperature decrease, also called herein "free cooling."

A similar effect on the solar reflectance of the composite granules can be observed if the cooling is conducted very slowly at a cooling rate not greater than 2° C. per minute, preferably not greater than 1° C. per minute, or not greater than 0.5° C. per minute.

In certain embodiments, the temperature at the temperature hold may be not greater than 900° C., such as not greater than 875° C., not greater than 850° C., or not greater than 825° C. In other certain embodiments, the temperature hold may be at a temperature of at least 700° C., such as at least 725° C., at least 750° C., at least 775° C., or at least 800° C. The temperature hold can be at a value between any of the minimum and maximum values note above, such as from 700° C. to 900° C., from 725° C. to 875° C., or from 750° C. to 850° C.

In embodiments, the time for holding the temperature during cooling of the granules can be at least 0.5 hours, such as at least 1.0 hour, at least 1.5 hours, or at least 2 hours. In other embodiments, the time for holding the temperature may be not greater than 6 hours, such as not greater than 5 hours, or not greater than 4 hours. The temperature holding time during cooling can be a value between any of the minimum and maximum values noted above, such as from 1.0 hour to 6 hours, from 1.5 hours to 5 hours, or from 2 hours to 4 hours.

In certain embodiments, the difference in solar reflectance $\Delta SR$ of composite granules subjected to a temperature hold ($SR_{TH}$) in comparison to composite granules made without including a temperature hold ($SR_F$) can be at least 3%, such as at least 4%, at least 5%, or at least 6%, wherein $\Delta SR = SR_{TH} - SR_F$.

Unexpectedly, a temperature hold during cooling in the range of 700–900° C. can increase the solar reflectance of the roofing granules, yet, the light intensity L* may be not significantly affected by the temperature hold, and the L* values remain substantially constant. This allows the making of composite granules with a high solar reflectance but a corresponding low lightness L*.

In a particular embodiment, the roofing granules of the present disclosure can have a solar reflectance of at least 25% and an L* value not greater than 50 without any applied coatings on the surface of the composite granules.

Furthermore, unexpectedly, the maximum sintering temperature can also affect the solar reflectance of the composite granules. In one particular embodiment, an increase of 25° C. in the maximum sintering temperature, from 1075° C. to 1100° C., can lead to a significant drop in solar reflectance of about 20 points. Not to be bound by theory, the strong decrease in solar reflectance and development of a relatively dark color after reaching a certain sintering temperature may depend on the type of aluminosilicate rock from which the granule fines are obtained, particularly of the iron content within such rock. At a certain temperature, when sintering causes phase changes within the sintered material and partial fusing and melting, it appears that Fe ions can migrate to the surface of the granules, together with the forming of a glassy phase on the granule surface, and decrease porosity.

Accordingly, in order to obtain roofing composite granules with desired optical properties and strength, depending on the type of aluminosilicate, a maximum sintering temperature may be selected close to the point at which a large drop in solar reflectance and lightness of the composite granules occurs, which is also named herein as "color drop temperature ($T_{cd}$)." As used herein, the $T_{cd}$ is intended to mean a sintering temperature at which a decrease in solar reflectance ($\Delta SR_{cd}$) of at least 8% SR occurs, such as at least 9% SR, at least 10% SR, at least 15% SR, or at least 20% SR. In one particular embodiment, the color drop temperature $T_{cd}$ can be within a range from 1075° C. to 1100° C. with a color drop of at least 10% SR.

Selecting a maximum sintering temperature too far below the color drop temperature $T_{cd}$ can have the disadvantage of forming composite granules with insufficient strength. In certain embodiments, the maximum sintering temperature may be not less than 50° C. lower than the color drop temperature, such as not less than 25° C., or not less than 20° C. In other certain embodiments, the maximum sintering temperature can be not greater than 50° C. than the color drop temperature, such as not greater than 25° C., not greater than 10° C., or at the same temperature as the color drop temperature.

In other particular embodiments, the solar reflectance and lightness L* of the composite granules of the present disclosure may be further increased by adding white dopants during granulation (1.2) when forming the green body granules. Non-limiting examples of white dopants can include aluminum trihydrate (ATH), titanium dioxide, zinc oxide, or magnesium hydroxide.

Unexpectedly, the highest increase in solar reflectivity could be obtained when ATH was added during the granulation step, in comparison to other dopants, such as titanium dioxide, zinc oxide, or magnesium hydroxide. Accordingly, in a particular embodiment, the composite granules of the present disclosure are essentially free of $TiO_2$, $ZnO_2$, and $Mg(OH)_2$. Essentially free means unavoidable impurities or amounts of less than 0.1 wt % based on the total weight of the composite granules.

The amount of ATH added to the granulating mixture to form the green body granules can be at least 1 wt %, such as at least 2 wt %, at least 3 wt %, at least 4 wt %, or at least 5 wt % based on the total weight of the green body granules. In other particular embodiments, the amount of ATH may be not greater than 12 wt %, such as not greater than 10 wt %, or not greater than 8 wt %. The amount of ATH added to the granule mixture can be a value between any of the minimum and maximum values noted above, such as from 1 wt % to 12 wt %, from 2 wt % to 8 wt %, or from 3 wt % to 5 wt % based on the total weight of the green body granules.

In further particular embodiments, the median particle size of the ATH added to the granulation mixture can be at least 0.1 µm, such as at lest 0.5 µm, or at least 1 µm. In other particular embodiments, the median particle size of ATH may be not greater than 40 µm, such as not greater than 35 µm, not greater than 30 µm, not greater than 25 µm, not greater than 20 µm, not greater than 15 µm, not greater than 10 µm, or not greater than 5 µm. The median particles size of the ATH can be a value between any of the minimum and maximum values note above, such as from 0.1 µm to 40 µm, from 1 µm to 20 µm, from 1 µm to 10 µm, or from 0.5 µm to 5 µm. A particularly beneficial increase in solar reflectance can be obtained with ATH having a particle size range within 1 µm and 10 µm.

In particular embodiments, adding ATH as dopant to the granulating mixture may result in an increase in solar reflectance of the composite granules by at least 50% based on the solar reflectance of the composite granules without dopants, such as at least 60%, at least 70%, at least 80%, at least 90%, or at least 100%. For example, the solar reflectance SR of composite granules can be increased from an SR of 19% to an SR of 39% (which is an increase of 105%) by adding 5 wt % ATH to the granule fines, as shown in Example 2.

The composite granules of the present disclosure obtained by the above described process can have a high solar reflectance SR together with a comparable low lightness L*, a low weight (low bulk density), good strength and weather resistance, which makes them particularly suitable as roofing granules.

In embodiments, the composite granules of the present disclosure can have a solar reflectance of at least 25%, such as at least 30%, and least 35%, at least 37%, at least 40%, at least 43%, at least 45%, at least 47%, or at least 50%.

In other embodiments, the composite granules can have a lightness L* of not greater than 60, such as not greater than 55, not greater than 50, not greater than 45, or not greater than 40. In yet other embodiments, the lightness L* may be at least 15, such as at least 20, or at least 25.

The strength of the composite granules of the present disclosure, expressed in the crush strength measured by the test method as specified herein, can be at least 40 N, such as at least 42 N, at least 45 N, at least 47 N, or at least 50 N.

The composite granules of the present disclosure can further possess a high freeze/thaw durability. The freeze/thaw durability was tested to simulate the environment on the roof and to measure its effect on the composite granules. During the test, the granules are subjected to multiple freeze/thaw cycles, each cycle including submerging the granules in water, freezing the granules, and then defrosting at room temperature. The testing results after 10 to 30 cycles showed that even after 30 freeze thaw cycles, at least 98 wt % of the composite granules remained on a 40 mesh size screen. In particular embodiments, after an exposure to 30 freeze/thaw cycles, the composite granules of the present disclosure can remain at least 98.5 wt % or at least 99 wt % of its original total weight.

The composite granules of the present disclosure can further have an abrasion resistance which is similar to the abrasion resistance of commercial rock-based roofing granules. Under abrasion resistance, as used herein, should be understood a percent breakdown of the granules if subjected to the granule breakdown test of the Asphalt Roofing Manufacturer's Association (ARMA 1993), which simulates the granule processing and handling conditions throughout a typical shingle making process, and is in detail described in the experimental part of the present disclosure.

In embodiments, the breakdown of the composite granules if subjected to the ARMA test is not greater than 6 wt %, such as not greater than 7 wt %, not greater than 8 wt %, or not greater than 9 wt %.

A further particular advantage of the composite granules of the present disclosure is its low bulk density. In embodiments, the bulk density is not greater than 1.2 g/cm$^3$, such as not greater than 1.1 g/cm$^3$, not greater than 1.0 g/cm$^3$, or not greater than 0.98 g/cm$^3$. In other embodiments, the bulk density is at least 0.6 g/cm$^3$, such as at least 0.7 g/cm$^3$, or at least 0.8 g/cm$^3$, or at least 0.9 g/cm$^3$. The bulk density can be a value between any of the minimum and maximum values noted above, such as from 0.7 g/cm$^3$ to 1.2 g/cm$^3$, from 0.8 g/cm$^3$ to 1.1 g/cm$^3$, or from 0.9 g/cm$^3$ to 1.0 g/cm$^3$.

The above described properties of the composite granules of the present disclosure may all relate the to composite granules being free of a coating In particular embodiments, the roofing granules may optionally include one or more coating layers. Possible type of coatings can be a pigment coating.

Unexpectedly, a pigment coating can lower the lightness L* of the composite granules but can maintain the solar reflectance. In a particular embodiment, the pigment coating can lower the L* value of the uncoated composite granules by at least 1% and does not lower the solar reflectivity of the uncoated composite granules.

A pigment coating may further improve the abrasion resistance, freeze/thaw durability and crush strength of the composite granules, as further shown in the examples.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A method of making a plurality of composite granules, comprising:

forming green body granules comprising an aluminosilicate;

heating the green body granules to form sintered granules;

cooling the sintered granules according to a cooling regime, wherein the cooling regime comprises a temperature hold between 700° C. and 900° C. for at least one hour.

Embodiment 2

A method of making a plurality of composite granules, comprising:

forming a plurality of green body granules comprising an aluminosilicate;

heating the green body granules to form sintered granules; and cooling the sintered composite granules at a cooling rate of not greater than 2° C. per minute to a temperature of 750° C.

Embodiment 3

The method of embodiment 1, wherein the temperature hold is conducted at a temperature range between 800° C. and 900° C., such as between 850° C. and 900° C.

Embodiment 4

The method of embodiments 1 or 3, wherein the temperature hold is at least 2 hours, such as at least 3 hours, or at least 5 hours.

Embodiment 5

The method of embodiments 1, 3, or 4, wherein the temperature hold is not longer than 15 hours, such as not longer than 12 hours, or not longer than 10 hours.

Embodiment 6

The method of embodiment 2, wherein the cooling rate is not greater than 1° C./minute or not greater than 0.5° C./minute to a temperature of 750°.

Embodiment 7

The method of any of embodiments 1 or 3-5, wherein a difference in solar reflectance $\Delta SR$ of a SR of composite granules subjected to the temperature hold ($SR_{TH}$) in comparison to a SR of composite granules not subjected the temperature hold ($SR_F$) is at least 3%, such as at least 4%, at least 5%, or at least 6%, with $\Delta SR = SR_{TH} - SR_F$.

Embodiment 8

The method of any of the preceding embodiments, wherein the solar reflectance of the composite granules is at least 25%, such as at least 28%, or at least 30%.

Embodiment 9

The method of any of the preceding embodiments, wherein the L* value of the composite granules is not greater than 50, such as not greater than 48, or not greater than 45.

Embodiment 10

The method of any of the preceding embodiments, wherein forming of the green body granules includes adding of a solvent and at least 0.5 wt % of a binder based on the total weight of the green body granules.

Embodiment 11

The method of embodiment 10, wherein the binder is modified starch.

Embodiment 12

The method of embodiment 10, wherein the solvent is water.

Embodiment 13

The method of any of the preceding embodiments, wherein forming of the green body granules includes adding of ATH in an amount of at least 2 wt %, such as at least 3 wt %, at least 5 wt %, or at least 7 wt % based on the total dry weight of the green body granules.

Embodiment 14

The method of embodiment 13, wherein an amount of ATH in the green body granules is not greater than 20 wt %, such as not greater than 15 wt %, or not greater than 10 wt % based on the total dry weight of the green body granules.

Embodiment 15

The method of embodiments 13 or 14, wherein the ATH has a median particles size not greater than 30 μm, such as not greater than 25 μm, not greater than 20 μm, not greater than 10 μm, or not greater than 5 μm.

Embodiment 16

The method of any of the preceding embodiments, further including sizing the green body granules to a size of at least 0.3 mm and not greater than 3.0 mm.

Embodiment 17

The method of any of the preceding embodiments, wherein heating is performed up to a maximum sintering temperature of at least 1000° C., such as at least 1025° C., or at least 1050° C.

Embodiment 18

The method of any of the preceding embodiments, wherein heating is performed up to a maximum sintering temperature not greater than 1300° C., such as not greater than 1250° C., not greater than 1200° C., not greater than 1150° C., or not greater than 1100° C.

Embodiment 19

The method of embodiments 17 or 18, wherein the maximum sintering temperature is within a range of ±50° C. of a color drop temperature $T_{cd}$ of the aluminosilicate, the $T_{cd}$ being a sintering temperature wherein a decrease in solar reflectance ($\Delta SR_{cd}$) of at least 8% SR occurs.

Embodiment 20

The method of embodiment 19, wherein the maximum sintering temperature is not less than 25° C. and not greater than 10° C. of the color drop temperature $T_{cd}$ of the aluminosilicate.

Embodiment 21

The method of embodiments 19 or 20, wherein the color drop temperature $T_{cd}$ ranges from 1075° C. to 1100° C.

Embodiment 22

The method of any of the preceding embodiments, wherein the aluminosilicate is obtained from a natural rock.

Embodiment 23

The method of embodiment 22, wherein the natural rock includes rhyolite, andesite, basalt, meta-basalt, or any combination thereof.

Embodiment 24

The method of any of the preceding embodiments, wherein the amount of aluminosilicate in the green body granules is at least 50 wt %, such as at least 60 wt %, at least 70 wt %, at least 80 wt %, at least 90 wt %, or at least 95 wt % based on the total dry weight of the green body granules.

Embodiment 25

The method of any of the preceding embodiments, wherein the aluminosilicate in the green body granules has an average particle size not greater than 250 µm, such as not greater than 200 µm, not greater than 180 µm, not greater than 150 µm, not greater than 120 µm, or not greater than 100 µm.

Embodiment 26

The method of any of the preceding embodiments, wherein the aluminosilicate in the green body granules has an average particle size of at least 30 µm, such as at least 35 µm, at least 40 µm, or at least 45 µm.

Embodiment 27

The method of any of the preceding embodiments, wherein a bulk density of the composite granules is not greater than 1.0 g/m$^3$.

Embodiment 28

The method of any of the preceding embodiments, wherein the composite granules have an average crush strength of at least 45 N.

Embodiment 29

The method of any of the preceding embodiments, wherein the composite granules have a roundness of at least 0.9.

Embodiment 30

The method of any of the preceding embodiments, wherein the green body granules are essentially free of $TiO_2$, $ZnO_2$, and $Mg(OH)_2$.

Embodiment 31

The method of any of the preceding embodiments, further comprising applying a pigment coating on the composite granules.

Embodiment 32

The method of embodiment 31, wherein the pigment coating lowers the L* value of the composite granules by at least 1% and does not lower the solar reflectivity of the composite granules.

Embodiment 33

A plurality of composite granules, comprising:
a bulk density not greater than 1.0 g/cm$^3$;
an amount of aluminosilicate of at least 50 wt % based on the total weight of the plurality of composite granules;
an amount of aluminum trihydrate of at least 2 wt % based on the total weight of the plurality of composite granules;
a solar reflectance of at least 25%;
an L* value of not greater than 50; and a
an average crush strength of at least 45 N.

EXAMPLES

The following non-limiting examples illustrate the concepts described herein.

Example 1

Evaluating Granule Fines Regarding the Effect of Sintering and Cooling Conditions on SR and L*:

Granule fines of natural rock rhyolite (<0.5 µm) were sieved into two different size fractions: a) coarse powder with a particles size of 150-250 µm and b) fine powder with a particle size smaller than 150 µm.

From both powder fractions, cylinder coupons were pressed under a pressure of 1000 psi, using per coupon 10 g granule fines. One coupon had a diameter size of 2 inches and a height of 0.5 inch.

The coupons were sintered in a furnace by heating at rate of 5° C./minute up to the maximum set sintering temperature in a range of 1000° C. to 1150° C., depending on the type of experiment. When the maximum sintering temperature was reached, the temperature was maintained for one hour at the maximum temperature, and thereafter the coupons were allowed to "free cooling" at the natural rate of the furnace.

The coupons were analyzed by the optical parameters SR and L* on the top surface of the coupons. As can be seen in Table 1, the coupons made of the fine powder fraction had much higher SR and L* values then the coupons of the course powder fraction up to a sintering temperature of about 1050° C. A sintering temperature higher than 1050° C. resulted in a large darkening of the color of the coupons, and a difference of SR and L* between the coupons of the fine and the coarse fraction became much lower.

TABLE 1

Sintering coupons of coarse and fine fraction of granule fines at varying temperatures

| | Fines size [µm] | | | | | |
|---|---|---|---|---|---|---|
| | Sintering 1000° C. max | | Sintering 1050° C. max | | Sintering 1100° C. max | |
| | SR | L* | SR | L* | SR | L* |
| <100 µm (fine) | 44 | 57 | 39 | 51 | 19 | 40 |
| 150-250 µm (coarse) | 29 | 48 | 27 | 47 | 17 | 39.5 |

In view of the higher SR and L* values of the fine fraction (<150 µm) up to a temperature of 1050° C., further experiments were conducted only with coupons of the fine fraction. Specifically, the temperature range of 1075° C. and 1100° C. was investigated, at which a large drop in of the SR and the L* values could be observed, but also an increase in strength.

Table 2 summarizes the results with further focus on different cooling profiles. A temperature holding period at 850° C. between 2 and 5 hours resulted in samples having a 4 to 5 point higher solar reflectance (SR) then samples that were allowed to cool freely, without a temperature holding period. Surprisingly, the different cooling profiles had no effect on the color of the coupons. The measured L* values were identical for coupons with and without holding period during cooling.

It can be further seen from Table 2, that just a minor increase of the maximum sintering temperature from 1075° C. to 1100° C. resulted in a significant decrease of the SR values and darkening of the granules. Not wishing to be bound by theory, the decrease in solar reflectance and development of a dark color after reaching a certain maximum sintering temperature appears to be a complex process, including an increase of Fe ions on the surface of the granules, the forming of a glassy phase on the surface, and a decrease in porosity.

TABLE 2

Coupons of fine fraction of granule fines (<150 µm) subjected to different sintering and cooling profile

|  | Sintering 1075° C. max | | Sintering 1100° C. max | |
| --- | --- | --- | --- | --- |
|  | SR | L* | SR | L* |
| Free cool | 32 | 47.5 | 17 | 39.8 |
| 2 hours hold at 850° C. | 36 |  | 19 |  |
| 5 hours hold at 850° C. | 37 | 48 | 20 | 40 |
| Cooling rate 2° C./min to 750° C. | 35 |  | 19 |  |

Example 2

Adding Different Types of Dopants to Granule Fines.

Coupons were made of granule fines <150 µm according to the same procedure as described in Example 1, except that in addition to the granule fines, different types of white dopants were added in an amount of 1 wt % and 5 wt % based on the total weight of the mixture of granule fines and dopants. The following dopants were added: titanium dioxide ($TiO_2$), zinc oxide (ZnO), aluminum trihydroxide (ATH), and magnesium hydroxide $Mg(OH)_2$.

The sintering was conducted at 1100° C., with a holding time of one hour at the maximum sintering temperature. The cooling regime was conducted under controlled cooling including a temperature hold of two hours at 850° C.

It can be seen in Table 3 that the best dopant effect with regard to an increase in solar reflectance SR had ATH, especial ally if contained at a concentration of 5 wt %, which could nearly double the SR values from 19% to 39%.

TABLE 3

Coupons made with granule fines (<150 µm) and different dopants

| Dopant | Amount [wt %] | Solar Reflectance [%] |
| --- | --- | --- |
| No dopant | — | 19 |
| ATH | 1 | 23 |
|  | 5 | 39 |
| TiO2 | 1 | 19 |
|  | 5 | 34 |
| ZnO | 1 | 19 |
|  | 5 | 20 |
| Mg(OH)2 | 1 | 16 |
|  | 5 | 21 |

Example 3

Investigation of ATH Doped Granule Fines

Coupons were prepared of granule fines as described in Examples 2 with varying amounts of ATH (ATH Hydral 710 from Huber): 1 wt %, 5 wt %, 7.5 wt % and 10 wt % based on the total weight of granule fines and ATH. The experiment focused on varying the maximum sintering temperature from 1000° C. to 1150° C., and measuring the corresponding SR and L* values.

An interesting observation could be made at 1100° C. with 5 wt % ATH. In comparison to coupons not containing ATH or low amounts of 1 wt %, the drop in SR was much lower with 5 wt % ATH, see also Table 4. A higher sintering temperature has the advantage of a higher strength of the sintered materials. Accordingly, it appears that a combination of parameters, such as sintering temperature, amount and type of doping, and particle size of the granule fines may lead to a surprising advantage of properties, such as a high SR, a low L* and a high strength.

TABLE 4

Coupons made of granule fines and different amounts of ATH subjected to varying maximum sintering temperatures

|  | Amount of ATH [wt %] | | | |
| --- | --- | --- | --- | --- |
|  | 0 | 1 | 5 | 10 |
|  | SR | SR | SR | SR |
| 1000° C. | 47 | 48 | 50 | 54 |
| 1050° C. | 42 | 43 | 48 | 53 |
| 1100° C. | 20 | 22 | 39 | 45 |

ATH doping was further investigated by comparing different cooling regimes with regard to the effect on solar reflectance and lightness L*. Coupons were prepared with granules fines containing 2.5 wt % ATH and 7.5 t % ATH, subjected to high temperature sintering up to a maximum sintering temperature of 1100° C., and cooled according to two different cooling regimes: a) free cooling and b) cooling including a temperature hold at 850° C. for two hours.

It could be observed that next to a large increase in solar reflectance by adding ATH, the cooling regime also had an influence of the final solar reflectance, but not on the lightness L* of the coupons: In samples that were cooled by including a two hour temperature hold at 850° C., the solar reflectance was about 4% to 5% higher in comparison to samples that were allowed to free cool. In contrast, the L* values remained the same, independent of the conducted cooling regime. These effects could be observed with 2.5 wt % ATH and 7.5 wt % ATH, see Table 5.

TABLE 5

Comparison of different cooling regimes on SR and L* of ATH doped granule fines, sintered up to 1100° C. maximum sintering temperature

|  | 2.5 wt % ATH | | 7.5 wt % ATH | |
| --- | --- | --- | --- | --- |
|  | SR[%] | L* | SR[%] | L* |
| Free Cooling | 28.7 | 48 | 39.1 | 58 |
| 850° C./2 hours | 33.4 | 48 | 43.4 | 58 |

Example 4

Effect of ATH Particle Size on Solar Reflectance

Coupons were prepared as described in Example 3, with varying amounts of ATH. Moreover, three different commercial ATH products from Huber with different particle sizes were compared, as summarized in Table 6.

TABLE 6

Tested ATH products and related median particle sizes

| ATH Brand/manufacturer | Median Particle Size [μm] |
|---|---|
| C33 | 46.4 |
| 402 | 3.5 |
| Hydral 710 | 1.2 |

Figure 2:
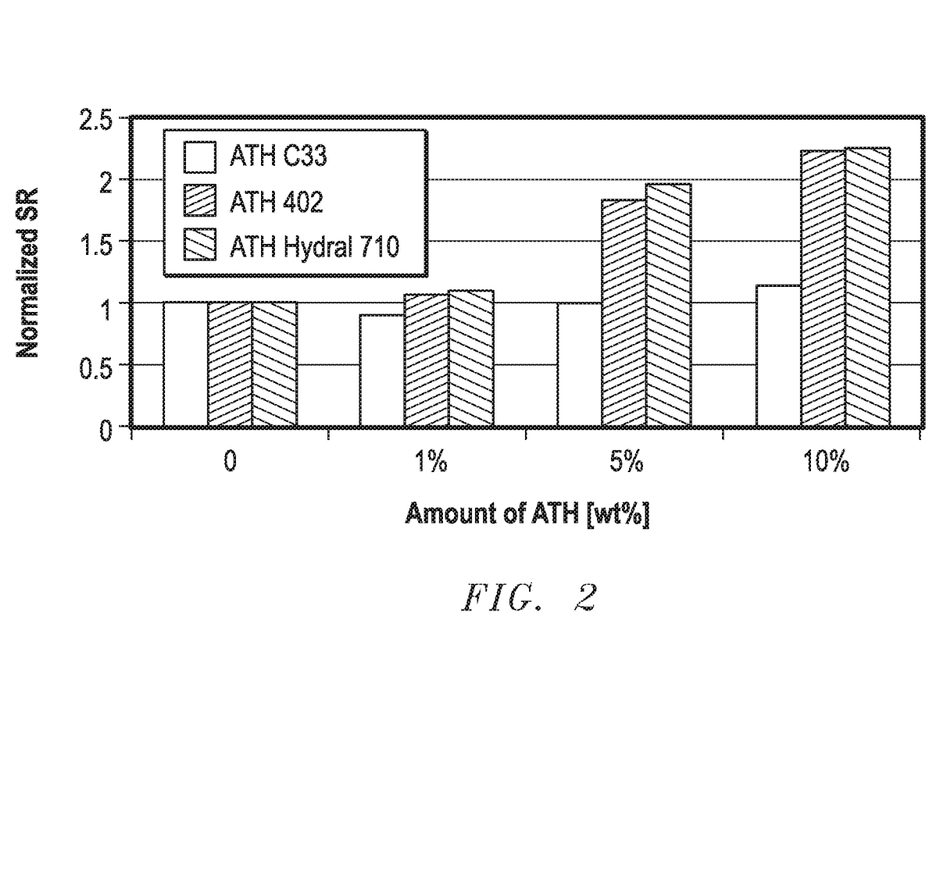
FIG. 2 includes a graph showing the effect of the ATH median particles size and concentration with regard to an increase in solar reflectance of granule fines according to certain embodiments.

As can be seen in FIG. 2, while ATH product C33 with the largest particle size of 46.4 μm had nearly no influence on an increase of the solar reflectance of the granule fines at any ATH concentration, the products with a much lower particle size (1.2 μm and 3.5 μm), especially at amounts of 5 wt % ATH and 10 wt % ATH, resulted in a clear increase in SR, and both products behaved very similar. The trend within these samples was that the smaller particle size product had the largest increase in solar reflectance.

Example 5

Preparing of Composite Roofing Granules.

In an Eirich Mixer R-04, 84 wt % granule fines of rhyolite with a particle size smaller than 150 μm (the same as in Examples to 4), 1 wt % modified starch (ethylated starch from GPC), and 15 wt % water were mixed together to form green body granules. The mixing was conducted that first the granule fines and the starch was dry mixed for one minute, and thereafter the water was slowly added to the dry mixture and mixed at low intensity for another minute, followed by 5 minutes high intensity mixing to form the granules. Each batch produced about 1.75 kg green composite granules.

After the granulation, the green composite particles were sized by sieving through a sieve having a 3.35 mm mesh size (size 6) and falling on a sieve having a 0.425 mm mesh size (size 4), in order to remove large and very fine particles. Thereafter, the green body granules were subjected to high temperature sintering.

The green composite granules were sintered by heating at a rate of 5° C./min to a maximum sintering temperature of 1075° C. (1075 CP) and 1100° C. (1100 CP), and cooled under controlled cooling, including a temperature hold at 850° C. for 2 hours.

Example 8

Pigment Coating

Composite granules of the type 1075 CP from Example 7 were pigment coated. The applied pigment coating was SR46 and applied by pan coating, wherein the granules and paint solution were shaken together to coat.

The pigment coating was able to maintain the solar reflectance but could lower the L* value by 2-3 points. Furthermore, the pigment coating made the composite granules more abrasion resistant and more durable if subjected to a multi-cycle freeze/thaw test. (see summary table 7 of Example 9).

Example 9

Properties of Composite Roofing Granules

The composite roofing granules of Example 7 and 8 (1075 CP and 1100 CP) were tested for the following properties: SR, L*, crush strength, abrasion resistance, freeze/thaw durability, and roundness. The experiments include comparisons with base rock roofing granules (Base Rock), which were rock granules from the same type of rock (Rhyolite) from which the granule fines were obtained. Other comparison materials were commercial pigment coated rock granules of CertainTeed (SR46); and a commercial product of composite granules called Firestone UltraWhite granule from FireStone Building Products, which is mined kaolin crushed to granule size and calcined.

The testing results are summarized in Table 7 below.

TABLE 7

Summary of tested properties of prepared composite granules and comparison with commercial products

|  | 1075 CP | 1100 CP | Pigment coated 1075 CP | Firestone CP | Base Rock | SR 46 |
|---|---|---|---|---|---|---|
| SR [%] | 28.0 | 19.0 | 28.0 | 66.6 | 16.6 | 31.8 |
| L* | 42.2 | 35.5 | 40.5 | 82.3 | 47.8 | 44.7 |
| Average Force to crush single particle [N] | 48.9 | 55.3 | 66.0 | 38.4 | 96.9 | 110 |
| Abrasion Resistance - amount of 16/30 [% breakdown] | 10.0 | 7.5 | 4.6 | 5.8 | 3.75 | 8.2 |
| Freeze/Thaw 10 cycles [% retained] | 99.60 | 99.78 | 99.98 | 99.50 | 99.70 | 99.75 |
| Freeze/Thaw 30 cycles [% retained] | 99.00 | 99.50 | 99.95 | 99.43 | 99.65 | 99.70 |
| Bulk density [g/cm³] | 0.921 | 1.042 | 0.951 | 0.977 | 1.344 | 1.369 |

Measurement of Solar Reflectance SR and Lightness L*

The SR measurements have been made on coupons according to ASTM C-1549 (2009). The lightness L* was measured with a HunterLab Labscan XE colorimeter.

Measurement of the Crush Strength

Crush strength testing was conducted to simulate the loading of granules on a roof. The granules of one batch were pre-sized by sieving through a 6/10 screen combination, which corresponds to about 2.5 mm diameter granule size. The crush test was conducted by measuring the force to crush one single particle, repeating the test on 30 single granules of the sized batch and calculating an average value of the test results. The crush test results of all tested materials are shown in Table 7 and in FIG. 3.

Figure 3:
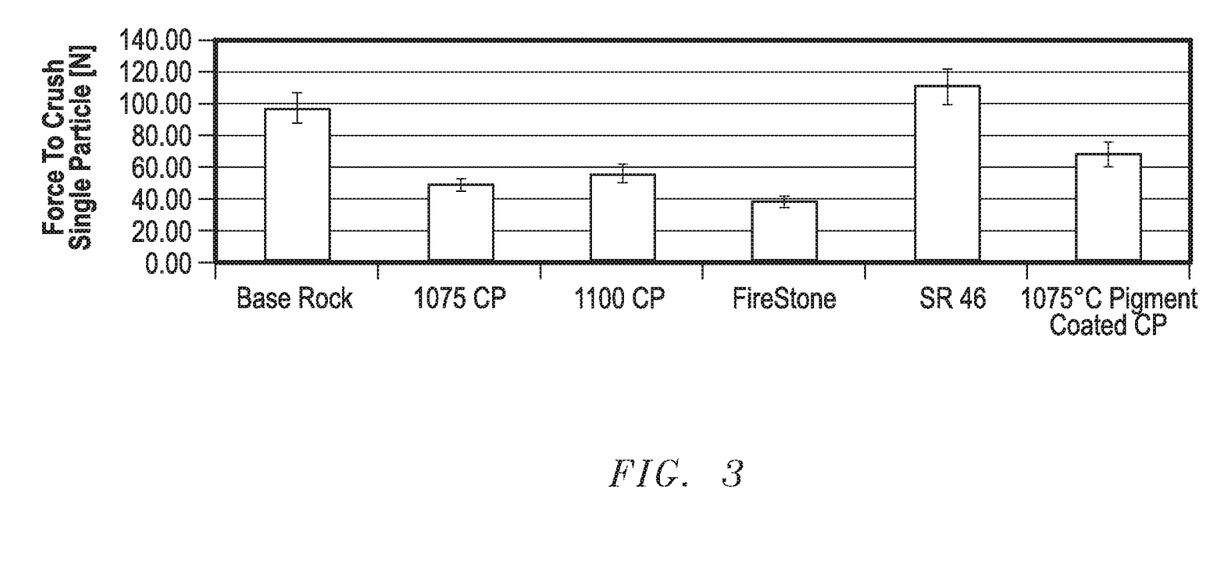
FIG. 3 includes a graph showing the force to crush one single composite granule according to certain embodiments, as well as the force required for crushing commercial roofing granules of different structure.

The results show that Base Rock and SR 46, CertainTeed's commercial rock product, have the highest strength, as expected. However, the 1075 and 1100 Composite Particles had a higher strength as Firestone's non-rock commercial granule. The 1075 Pigment Coated Composite Particle showed a further strength increase in comparison to non-coated 1075 CP and 1100 CP.

Measurement of the Freeze/Thaw Durability

Figure 4:
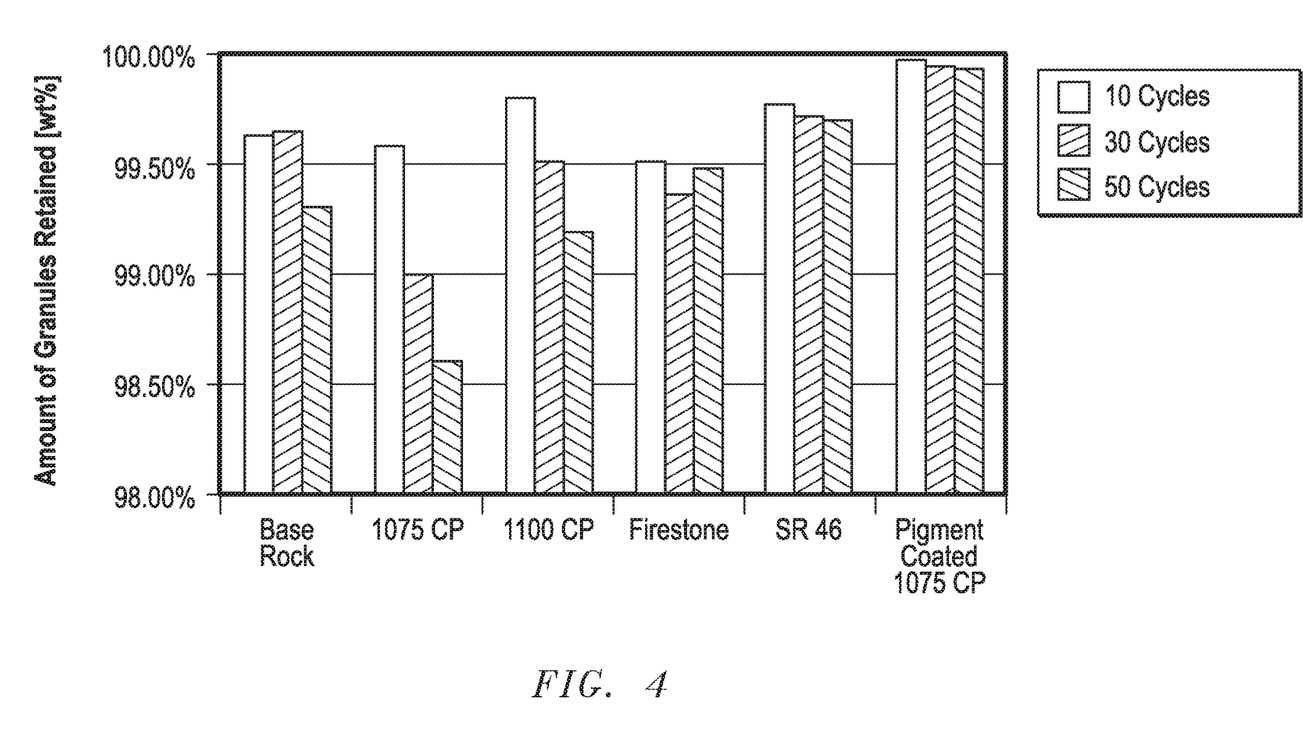
FIG. 4 includes a graph showing freeze/thaw durability of the composite granules according to certain embodiments in comparison to commercial roofing granules of different structure.

Freeze/Thaw testing was conducted to simulate the environment on the roof and to measure the effect on the composite granules. The granules were subjected to 6/40 sieving materials (passing through a 3.35 mm size screen (mesh size 6) and falling on a sieve having a 0.425 mm openings (mesh size 40), and then subjected to Freeze/Thaw cycling. Each cycle consisted of submerging the granules in water, freezing them for 3 hours, and then defrosting at room temperature for 1 hour. The testing was completed for 10 and 30 cycles and the percentage of initial material retained on the 40 mesh size screen was calculated. The results are shown in Table 7 and in FIG. 4. All materials retained 98% or greater after 30 cycles. The pigment coated 1075 composite granules had the best performance (Pigment coated 1075 CP), outperforming Firestone's non-rock granule after 30 cycles as well as the base rock granules.

Measurement of the Abrasion Resistance (ARMA 1993 Method)

Abrasion resistance testing was done to simulate the granule processing and handling conditions that the materials would experience throughout the typical shingle making process. The procedure is the test method of the Asphalt Roofing Manufacturer's Association (ARMA), titled Abrasion Resistance of Roofing Granules, ARMA Granule Test Procedures Manual.

Figure 5:
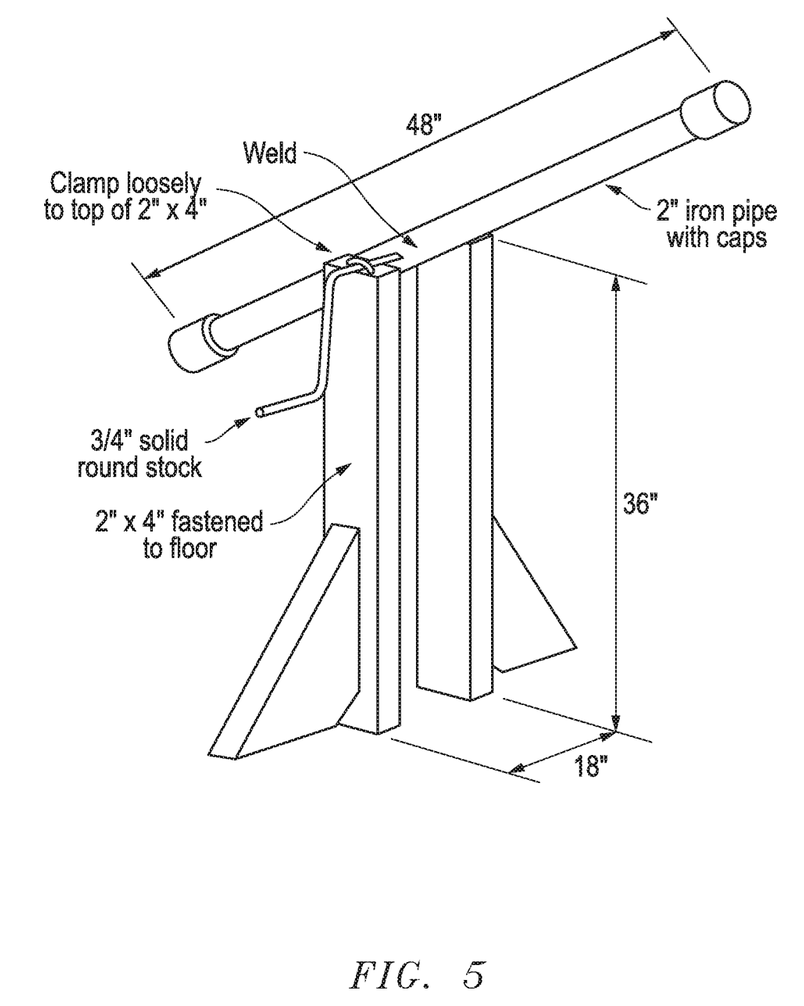
FIG. 5 includes an illustration of a testing device for measuring the abrasion resistance of roofing granules according to the test method of the Asphalt Roofing Manufacturer's Association (ARMA 1993).

The test material was pre-sieved 12/16 and 100 g of the sieved granules were filled in a metal test tube, and the test tube was 100 times rotated, see FIG. 5.

Figure 6:
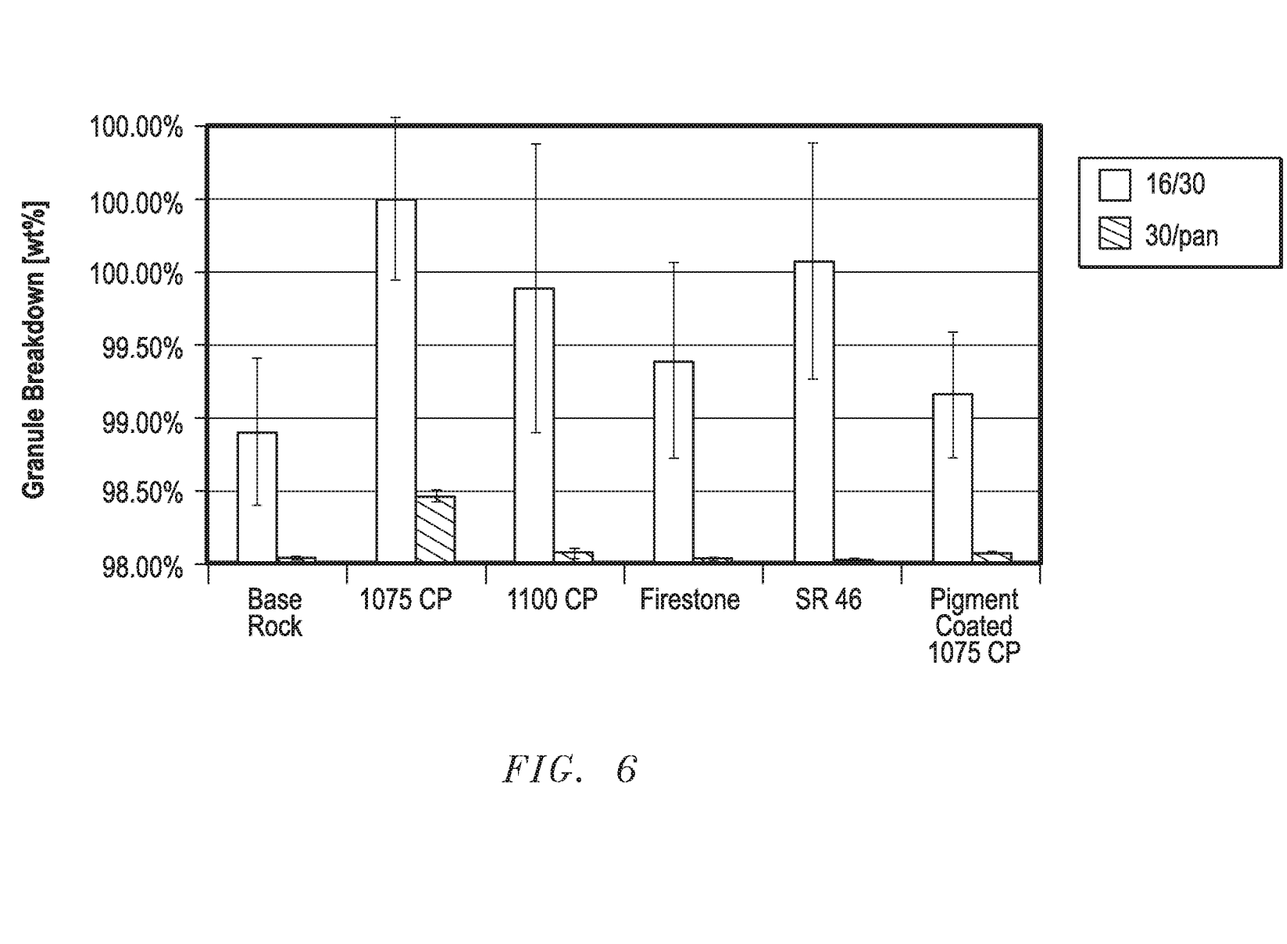
FIG. 6 includes a graph showing the abrasion resistance measured according the ARMA method demonstrated in FIG. 5 of composite granules according to certain embodiments, in comparison to commercial roofing granules of different structure.

After 100 rotations the material was recovered, and the amount passing a 30 mesh sieve determined and the percent breakdown calculated. The tests for each sample were three times repeated and the average value calculated. The results for all tested granule materials are shown in FIG. 6.

Overall, the results show that all tested materials generated less than 2 percent of 30/pan material. The pigment coated 1075 composite granules had equivalent performance to CertainTeed's current SR 46 granule and Firestone's non-rock granule for particle breakdown.

Measurement of the Bulk Density

Figure 7:
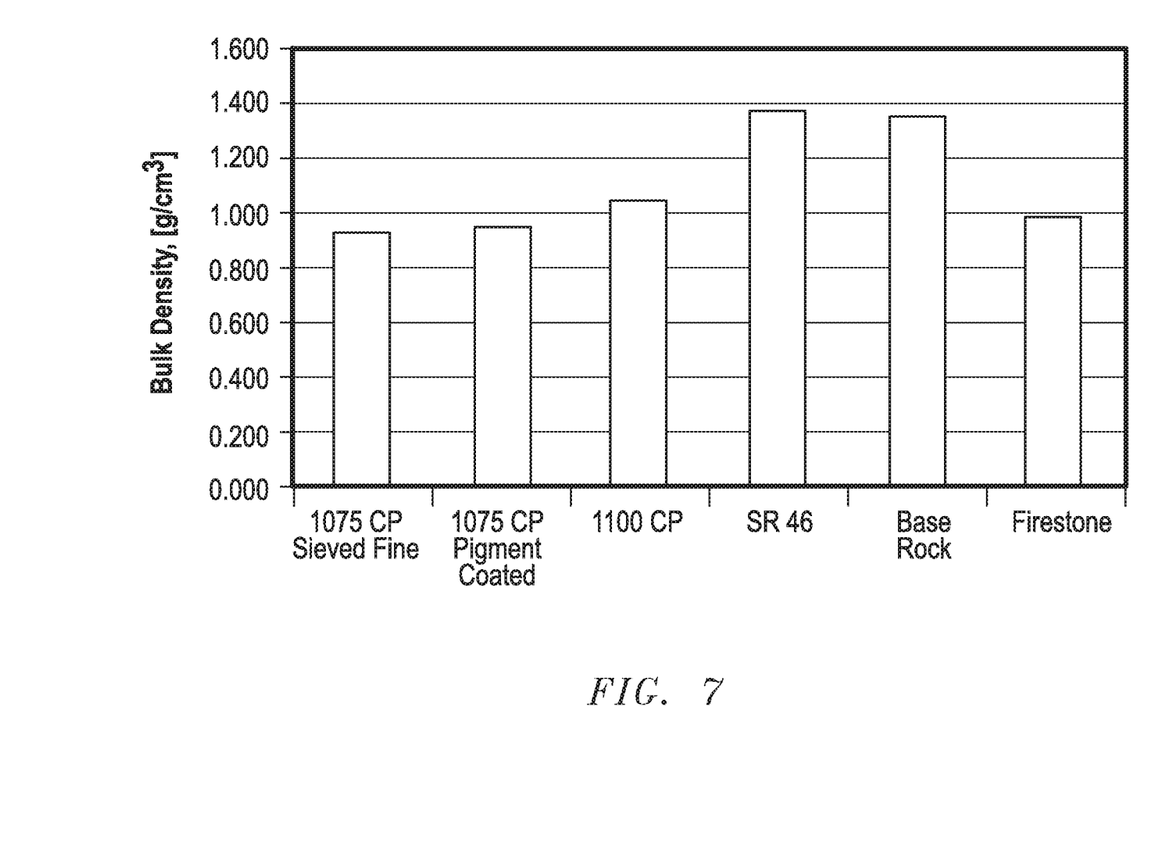
FIG. 7 includes a graph showing bulk densities of composite granules according to certain embodiments in comparison to commercial roofing granules of different structure.

The bulk density of all samples was measured by loosely filling a 10 ml cylinder having a volume of 13.68 cc with granules without applying pressure, and measuring the weight of the cylinder content. The bulk densities of the granule samples of the present disclosure, i.e, 1075 CP, 1100 CP, and 1075 CP pigment coated, are shown in FIG. 7 and Table 7. The bulk densities were compared with the bulk densities of commercial rock granules SR-46, Firestone composite granules, and rhyolite Base Rock granules. Granules representative of the present disclosure have much lower bulk densities then the rock-based granules SR-46 and Base Rock, as well as Firestone granules.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A plurality of composite granules, comprising:
   an amount of aluminosilicate of at least 70 wt % based on the total weight of the composite granules;
   an amount of aluminum trihydrate of at least 2 wt % based on the total weight of the composite granules;
   a solar reflectance (SR) of at least 25%; and
   a L* value is not greater than 50; and,
   wherein the composite granules are free of a coating which increases solar reflectance.

2. The plurality of composite granules of claim 1, wherein the composite granules are essentially free of titanium dioxide, zinc oxide, magnesium hydroxide.

3. The plurality of composite granules of claim 1, wherein a bulk density of the composite granules is not greater than 1.2 g/cm$^3$.

4. The plurality of composite granules of claim 1, wherein a crush strength of the composite granules is at least 45 N.

5. The plurality of composite granules of claim 1, wherein the composite granules further comprise titanium dioxide.

6. The plurality of composite granules of claim 1, wherein the composite granules further comprise zinc oxide.

7. The plurality of composite granules of claim 1, wherein the composite granules further comprise magnesium hydroxide.

8. A method of making a plurality of composite granules, comprising:
   forming green body granules comprising an aluminosilicate, water, and aluminum trihydrate, wherein the aluminosilicate has an average particle size of at least 30 microns and not greater than 150 microns; and an amount of the aluminosilicate is at least 70 wt % based on the total weight of the green body granules; and
   heating the green body granules to a maximum sintering temperature of at least 1000° C. and not greater than 1300° C.,
   wherein the plurality of composite granules comprise an amount of aluminum trihydrate of at least 2 wt % based on the total weight of the composite granules; an amount of aluminosilicate of at least 70 wt % based on the total weight of the composite granules; a solar reflectance (SR) of at least 25%; and a L* value not greater than 50; and wherein the composite granules are free of a coating which increases solar reflectance.

9. The method of claim 8, wherein the aluminosilicate is a natural rock including rhyolite, andesite, basalt, metabasalt, or any combination thereof.

10. The method of claim 9, wherein a maximum sintering temperature is not less than 50° C. below a color drop temperature $T_{cd}$ of the aluminosilicate.

11. The method of claim 10, wherein a maximum sintering temperature is not less than 25° C. below a color drop temperature $T_{cd}$ of the aluminosilicate.

12. The method of claim 8, wherein the green body granules are essentially free of titanium dioxide, zinc oxide, and magnesium hydroxide.

13. The method of claim 8, wherein the aluminum trihydrate has an average particle size of not greater than 30 microns.

14. The method of claim 8, wherein the green body granules further comprise titanium dioxide, or zinc oxide, or magnesium hydroxide, or any combination thereof.

15. The method of claim 8, further comprising controlled cooling the green body granules at a speed not greater than 2° C./minute.

16. The method of claim 8, further comprising controlled cooling the green body granules, wherein controlled cooling comprises conducting a temperature hold between 700° C. and 900° C. for at least one hour.

* * * * *